US011946639B2

(12) United States Patent
Vissenberg et al.

(10) Patent No.: US 11,946,639 B2
(45) Date of Patent: Apr. 2, 2024

(54) LIGHTING DEVICE

(71) Applicant: SIGNIFY HOLDING B.V., Eindhoven (NL)

(72) Inventors: Michel Cornelis Josephus Marie Vissenberg, Roermond (NL); Bartel Marinus Van De Sluis, Eindhoven (NL); Leendert Teunis Rozendaal, Valkenswaard (NL); Marcellinus Petrus Carolus Michael Krijn, Eindhoven (NL)

(73) Assignee: SIGNIFY HOLDING, B.V., Eindhoven (NL)

(*) Notice: Subject to any disclaimer, the term of this patent is extended or adjusted under 35 U.S.C. 154(b) by 0 days.

(21) Appl. No.: 18/022,705

(22) PCT Filed: Sep. 6, 2021

(86) PCT No.: PCT/EP2021/074442

§ 371 (c)(1),
(2) Date: Feb. 22, 2023

(87) PCT Pub. No.: WO2022/053419

PCT Pub. Date: Mar. 17, 2022

(65) Prior Publication Data

US 2023/0313972 A1 Oct. 5, 2023

(30) Foreign Application Priority Data

Sep. 10, 2020 (EP) .................................... 20195392

(51) Int. Cl.
*F21V 9/02* (2018.01)
*F21S 8/00* (2006.01)
(Continued)

(52) U.S. Cl.
CPC ................ *F21V 9/02* (2013.01); *F21S 8/033* (2013.01); *F21V 23/0492* (2013.01); *F21Y 2113/13* (2016.08); *F21Y 2115/10* (2016.08)

(58) Field of Classification Search
CPC .......... F21V 9/02; F21V 23/0492; F21V 7/28; F21V 7/0083; F21V 7/00; F21V 9/00;
(Continued)

(56) References Cited

U.S. PATENT DOCUMENTS

| | | | | |
|---|---|---|---|---|
| 9,791,131 | B2 | 10/2017 | Onac et al. | |
| 10,711,976 | B2 * | 7/2020 | Di Trapani | F21V 11/02 |

(Continued)

FOREIGN PATENT DOCUMENTS

| | | | |
|---|---|---|---|
| CN | 106954292 | A | 7/2017 |
| WO | 2013011481 | A2 | 1/2013 |

(Continued)

*Primary Examiner* — Bao Q Truong

(57) ABSTRACT

A lighting device, comprising an enclosure (120) comprising a plurality of partitioning elements (130*a-f*) to form within the enclosure a plurality of sub-spaces (140*a-e*) each comprising first and second reflective inner surfaces (170, 180), wherein each sub-space further comprises a light source (110) arranged to emit light with a light output, the light output comprising light beams in a blue wavelength range of 400-490 nm and in a non-blue wavelength range of 490-700 nm, a first part of the light output being incident on the first reflective inner surface of the sub-space and a second part of the light output being incident on the second reflective inner surface of the sub-space, wherein, for light within the blue wavelength range, the first reflective inner surface has a first blue reflectance (310) of >20%, and the second reflective inner surface has a second blue reflectance (320) of <20%.

14 Claims, 5 Drawing Sheets

(51) Int. Cl.

| | |
|---|---|
| ***F21V 23/04*** | (2006.01) |
| *F21Y 113/13* | (2016.01) |
| *F21Y 115/10* | (2016.01) |

(58) Field of Classification Search
CPC ....... F21V 15/01; F21S 8/033; F21Y 2113/13; F21Y 2115/10; F21K 9/62; F21K 9/64
See application file for complete search history.

(56) References Cited

U.S. PATENT DOCUMENTS

| | | | | |
|---|---|---|---|---|
| 2014/0029235 | A1 | 1/2014 | Onac et al. | |
| 2014/0160719 | A1 | 6/2014 | Van Boven et al. | |
| 2018/0252374 | A1 | 9/2018 | Keller et al. | |
| 2019/0360661 | A1* | 11/2019 | Di Trapani ............. | F21V 11/06 |

FOREIGN PATENT DOCUMENTS

| | | | |
|---|---|---|---|
| WO | 2015049146 | A1 | 4/2015 |
| WO | 2017060101 | A1 | 4/2017 |
| WO | 2018091060 | A1 | 5/2018 |
| WO | 2019063753 | A1 | 4/2019 |

* cited by examiner

LIGHTING DEVICE

CROSS-REFERENCE TO PRIOR APPLICATIONS

This application is the U.S. National Phase application under 35 U.S.C. § 371 of International Application No. PCT/EP2021/074442, filed on September 6, 2021, which claims the benefit of European Patent Application No. 20195392.4, filed on September 10, 2020. These applications are hereby incorporated by reference herein.

FIELD OF THE INVENTION

The present invention generally relates to lighting devices in the form of artificial windows which are capable of providing a realistic appearance of authentic windows. In particular, the present invention relates to such lighting devices comprising light emitting diodes, LEDs.

BACKGROUND OF THE INVENTION

The use of light emitting diodes, LEDs, for illumination purposes continues to attract attention. Compared to incandescent lamps, fluorescent lamps, neon tube lamps, etc., LEDs provide numerous advantages such as a longer operational life, a reduced power consumption, and an increased efficiency related to the ratio between light energy and heat energy.

One field of application of LEDs is within lighting devices in form of so called artificial windows, wherein lighting devices of this kind are configured to mimic daylight, sunshine, or the like, in order to provide a realistic appearance of authentic windows. Typical examples of artificial daylight windows are artificial skylights. These skylights may have an optical architecture that is based on a focused beam of light that shines on a light-transmissive window that contains nanoparticles to scatter part of the blue light in the light beam. This creates a blue sky effect, and at the same time, a direct beam of artificial sunlight from the window. An alternative optical architecture is based on a non-directional (or even omni-directional) light source inside a cavity. The exit window of the cavity is clear or slightly diffuse to hide any structures in the cavity. In this way, the light that exits the cavity via the blue sidewalls may create a blue sky effect, whereas the direct light from the source may create a well delimited beam of artificial sunlight.

However, the artificial skylights as described above are not suitable to be provided as artificial windows on walls, in particular vertical walls. Notably, the artificial skylights provide an appearance of a sky which would render an unnatural effect if applied to a wall. Hence, it is of interest to improve the properties of lighting devices in form of artificial windows, and in particular lighting devices of these kinds which are intended for being arranged on walls.

SUMMARY OF THE INVENTION

Hence, it is of interest to improve the properties of lighting devices in the form of artificial windows, and in particular lighting devices of these kinds which are intended for arrangement on walls.

This and other objects are achieved by providing a lighting device having the features in the independent claim. Preferred embodiments are defined in the dependent claims.

Hence, according to the present invention, there is provided a lighting device, e.g. in the form of an artificial window for arrangement on a wall. The lighting device comprises an enclosure with a first axis, A, and a second axis, B, oriented perpendicular to each other. The enclosure comprises a back surface and a front surface separated from each other in a direction parallel to the second axis, B, by a plurality of partitioning elements to form within the enclosure a plurality of sub-spaces arranged next to each other in a direction parallel to the first axis, A. Each sub-space comprises a first reflective inner surface and a second reflective inner surface, for all sub-spaces the second reflective inner surface being located opposite to the first reflective inner surface in a same direction parallel to the first axis, A. Each sub-space further comprises a light source arranged to emit light towards the front surface with a light output. The light output comprises light beams in a blue wavelength range of 400-490 nm and in a non-blue wavelength range of 490-700 nm. A first part of the light output is incident on the first reflective inner surface of the sub-space and a second part of the light output is incident on the second reflective inner surface of the sub-space. For light within the blue wavelength range, the first reflective inner surface has a first blue reflectance and the second reflective inner surface has a second blue reflectance, wherein the first blue reflectance is more than 20% and the second blue reflectance is less than 20%.

Thus, the present invention is based on the idea of providing a lighting device, e.g. in the form of an artificial window, for arrangement on a wall. The light emitted from the lighting device during operation has a relatively high reflectance of blue, or at least blue-like, and/or white color in a first (downward) direction from the lighting device, and a relatively low reflectance of blue, or at least blue-like, color in a second (upward) direction from the lighting device. Consequently, an observer in front of the lighting device looking in an obliquely upward direction towards the lighting device may perceive light with (a) blue, blue-like and/or white color(s), which may resemble a (bright) blue sky, wherein the observer looking in an obliquely downward direction towards the window may not perceive the light as blue, or blue-like.

The present invention is advantageous in that the lighting device hereby efficiently and conveniently may achieve the effect of a (bright) blue sky for an observer looking into an upper portion of the lighting device, e.g. above a ‘horizon’. Furthermore, the observer may not (or may only to a limited extent) perceive any blue or blue-like color(s) looking in a lower portion of the lighting device. Consequently, the lighting device may render an authentic and/or realistic impression to an observer of being a ‘real’ window. Furthermore, the lighting device of the present invention overcomes a deficiency of the prior art in which an observer looking in an obliquely downward direction towards an artificial window may perceive the light as a blue sky, which may be perceived as non-authentic and/or non-realistic.

The present invention is further advantageous in that the versatility of the lighting device, due to the various settings, configuration and/or design thereof, is able to achieve a realistic and/or authentic impression of a ‘real’ window.

The present invention is further advantageous in that the lighting device may be provided with one or more LEDs as light source, thereby attaining the desirable properties of the lighting device as previously described while at the same time providing the numerous advantages of using LED technology.

The lighting device of the present invention may be arranged to provide an impression to an observer of a real, authentic window. The enclosure of the lighting device has a first axis, A, and a second axis, B, oriented perpendicular to each other. Hence, the enclosure extends along the first axis, A, and along the second axis, B. It will be appreciated that the first axis, A, may be a vertical axis, and that the second axis, B, may be a horizontal axis. Here, the terms "vertical" and "horizontal" also encompass "essentially vertical" and "essentially horizontal", respectively, i.e. that the enclosure may extend vertically and horizontally, or almost/substantially vertically and horizontally. For example, the enclosure of the lighting device may extend along the wall upon which the lighting device is intended to be arranged or mounted upon. The enclosure comprises a back surface and a front surface separated from each other in a direction parallel to the second axis, B, by a plurality of partitioning elements. By the term "partitioning elements", it is here meant substantially any elements for partitioning or dividing the enclosure, such as baffles, plates, or the like. The partitioning elements form, within the enclosure, a plurality of sub-spaces arranged next to each other in a direction parallel to the first axis, A. Hence, any two adjacently arranged partitioning elements at least partially define a sub-space of the enclosure. By this arrangement, each sub-space extends along the first axis, A, between two adjacently arranged partitioning elements, and along the second axis, B, from the back surface of the enclosure towards the front surface of the enclosure. Hence, the partitioning elements partition or divide the enclosure of the lighting device into sub-spaces. Each sub-space comprises first and second reflective inner surfaces, e.g. on the inner sides of two adjacently arranged partitioning elements, respectively. The first reflective inner surface is located opposite to the second reflective inner surface in a same direction parallel to the first axis, A.

Each sub-space of the lighting device further comprises a light source arranged to emit light towards the front surface with a light output. The light output comprises light beams in a blue wavelength range of 400-490 nm and in a non-blue wavelength range of 490-700 nm. By the term "blue wavelength range", it is here meant a first wavelength range of 400-490 nm, wherein the light comprises color(s) which is blue, or at least blue-like. Analogously, by the term "non-blue wavelength range", it is here meant a second wavelength range of 490-700 nm, wherein the light comprises color(s) which is not blue, nor blue-like. During operation of the lighting device, a first part of the light output is incident on the first reflective inner surface of the sub-space and a second part of the light output is incident on the second reflective inner surface of the sub-space. Hence, a first part or portion of the light emitted from the light source during operation of the lighting device is configured to impinge upon the first reflective surface(s) of the sub-space(s). Analogously, a second part or portion of the light emitted from the light source during operation of the lighting device is configured to impinge upon the second reflective surface(s) of the sub-space(s). Hence, the first part of the light output is reflected from the first reflective inner surface and propagates out of the sub-space at the front surface in a first direction with respect to the second axis, B. In case of the lighting device being arranged vertically, the first part of the light output propagates out of the sub-space at the front portion in an obliquely downward direction with respect to the second axis, B. In other words, an observer in front of the lighting device will perceive the first part of the light output emitted from the lighting device in an obliquely upward direction. Analogously, the second part of the light output is reflected from the second reflective surface and propagates out of the sub-space at the front surface in a second direction with respect to the second axis, B. In case of the lighting device being arranged vertically, the second part of the light output propagates out of the sub-space at the front surface in an obliquely upward direction with respect to the second axis, B. In other words, an observer in front of the lighting device will perceive the second part of the light output emitted from the lighting device in an obliquely downward direction.

For light within the blue wavelength range, the first reflective inner surface has a first blue reflectance and the second reflective inner surface has a second blue reflectance. In other words, the first and second reflective inner surfaces have a first and second blue reflectance, respectively, for light within the first wavelength range of 400-490 nm. By the term "blue reflectance", it is here meant a reflectance of blue, or at least blue-like, color(s) of the light. The first blue reflectance is more than 20% and the second blue reflectance is less than 20%. In other words, the reflectance of the first reflective inner surface is relatively high for the color(s) of the light which is blue, or at least blue-like. For example, an observer in front of the lighting device, perceiving the light emitted from the lighting device in an obliquely upward direction, may perceive light with a blue, or at least blue-like, color(s), e.g. in an upper portion of the lighting device. Furthermore, the reflectance of the second reflective inner surface is relatively low for the color(s) of the light which is blue, or at least blue-like. For example, an observer in front of the lighting device, perceiving the second light beam(s) emitted from the lighting device in an obliquely downward direction, may not perceive the color of the light as blue, nor blue-like, e.g. in a lower portion of the lighting device.

According to an embodiment of the present invention, for light within the non-blue wavelength range, the second reflective inner surface may have a second non-blue reflectance being higher than the second blue reflectance. By the term "non-blue reflectance", it is here meant a reflectance of light within the second wavelength range of 490-700 nm, i.e. color(s) of the light which is not blue, nor blue-like. In other words, the second non-blue reflectance of the second reflective inner surface may be higher for light within the second wavelength range of 490-700 nm, representing other colors than blue or blue-like colors, compared to light within the first wavelength range of 400-490 nm, representing blue or blue-like colors. The present embodiment is advantageous in that the light reflected from the second reflective inner surface may, to even higher extent, be perceptively separated from the blue (sky-like) color of the light reflected from the first reflective inner surface. More specifically, the light reflected from the second reflective inner surface may be perceived as e.g. brown, green, or a combination thereof, which may represent 'earth-like' colors. In other words, a portion of the lighting device above a 'horizon' may appear as a (bright) blue and/or cloudy sky, whereas a portion of the lighting device below a 'horizon' may appear darker, e.g. by brown and/or green color(s). Hence, by the present embodiment, the observer in front of the lighting device may be able to perceive light with a blue, or at least blue-like, color(s), which may resemble a sky, e.g. from an upper portion of the lighting device, whereas the observer may be able to perceive light with color(s) of e.g. brown, green, or a combination thereof, which may resemble earth, grass, shrubbery(ies), hedge(s), etc., from a lower portion of the lighting device.

According to an embodiment of the present invention, for light within the blue wavelength range, the first blue reflectance may be >80%. Hence, due to the relatively high reflectance of the first reflective inner surface of light within the wavelength range of 400-490 nm, the light reflected from the first reflective inner surface may, to even higher extent, comprise blue or blue-like color(s). The present embodiment is advantageous in that an observer in front of the lighting device even to a higher extent may perceive the light emitted from (an upper portion of) the lighting device as a sky.

According to an embodiment of the present invention, at least one of the first and second reflective inner surfaces may comprise color pigments. For example, the first reflective inner surface(s) may comprise blue or blue-like color pigments and/or the second reflective inner surface(s) may comprise pigments of e.g. green(-like) and/or brown(-like) colors. The present embodiment is advantageous in that the first and/or second reflective inner surface(s) may conveniently reflect light with the desired color properties, which consequently may render the lighting device in the form of an artificial window even more realistic or authentic to an observer.

According to an embodiment of the present invention, the color pigments of at least one of the first and second reflective inner surfaces may be non-uniformly distributed in the respective first and second reflective inner surfaces. In other words, certain (first) portion(s) of the first and/or second reflective inner surface(s) may comprise relatively high concentrations of certain color pigments (e.g. blue color pigments in a white host material), whereas certain (second) portion(s) of the first and/or second reflective inner surface(s) may comprise relatively low concentrations of that color pigment. It will be appreciated that this embodiment is feasible also for combinations of color pigments. The present embodiment is advantageous in that the lighting device in the form of an artificial window may even further increase the authenticity of a 'real' window for an observer during operation.

According to an embodiment of the present invention, the light source may be configured to emit colored light. For example, the light source may be configured to emit light with a first color (e.g. blue) and/or light with a second and/or third color (e.g. green and/or yellow). The present embodiment is advantageous in that the correlated color temperature (CCT) may conveniently change white light from the light source of the lighting device, e.g. for mimicking different seasons or the time of day. The present embodiment is further advantageous in that the lighting device may emit light with desired color properties in desired directions out of the lighting device.

According to an embodiment of the present invention, at least one sub-space of the plurality of sub-spaces may comprise a lens arranged at the front surface thereof. The present embodiment is advantageous in that the lighting device may be configured to focus and/or disperse the light emitted from the light source of the lighting device, which may result in the lighting device being able to provide an even more realistic perception of an authentic window by an observer.

According to an embodiment of the present invention, at least one partitioning element of the plurality of partitioning elements may be plate-shaped and may be arranged parallel to the second axis, B. The present embodiment is advantageous in that the light may be efficiently reflected from the first reflective inner surface and may propagate out of the lighting device in a first direction with respect to the second axis, B. Analogously, the light may be efficiently reflected from the second reflective inner surface and may propagate out of the lighting device in a second direction with respect to the second axis, B.

Furthermore, and according to yet another embodiment of the present invention, at least one partitioning element of the plurality of partitioning elements may be plate-shaped and may be arranged at an angle, a, with respect to the second axis, B. For example, the angle, a, may be set such that an observer may perceive a sky at a relatively high portion of the lighting device. The present embodiment is advantageous in that the angle(s) which an observer perceives different light from the lighting device may be set or customized. For example, in case of a building (e.g. office, home) with rooms at different floors, the lighting device may be set or customized by the adjustable partitioning elements as the horizon is perceived to be lower higher up in the building. Furthermore, the present embodiment is advantageous in that it also allows an adjustment of the lighting device in order to keep the horizon fixed in case the lighting device is arranged on an inclined wall.

According to an embodiment of the present invention, the at least one partitioning element may be adjustably arranged with respect to the angle, $\alpha$. Hence, one or more of the partitioning elements may be adjusted with respect to the angle, $\alpha$, during operation of the lighting device. The present embodiment is advantageous in that the adjustability of the partitioning element(s) of the lighting device may enhance the authenticity of the lighting device in form of an artificial window.

According to an embodiment of the present invention, the plurality of sub-spaces may be an array of sub-spaces arranged in a column along the first axis, A. The present embodiment is advantageous in that the exemplified lighting device, e.g. of oblong form, may be conveniently arrangeable on a wall of a building such as a house, office, or the like.

According to an embodiment of the present invention, the plurality of sub-spaces may be a matrix of sub-spaces arranged in at least one column along the first axis, A, and at least one row along a third axis, C, perpendicular to the first axis, A, and to the second axis, B. The present embodiment is advantageous in that the lighting device may have a relatively common form of a 'real' window, e.g. being square and or rectangular. For example, a 'real' window may hereby be conveniently replaced by a lighting device of the present embodiment.

According to an embodiment of the present invention, there is provided a lighting system comprising a lighting device according to any one of the previously described embodiments. The lighting system further comprises a control unit configured to control an operation of the light source based on an orientation of the lighting device. By the term "operation", it is here meant one or more of an 'on' state, an 'off' state, dimming, color setting, etc. For example, in case of an arrangement of a lighting device on a wall which is inclined (e.g. not strictly vertical), the control unit may be configured to control the operation of the light source based on this inclined orientation of the lighting device. The present embodiment is advantageous in that the lighting device may be adapted to the property(ies) of the wall on which it may be mounted upon, in order to correct the light emitted from the lighting device.

According to an embodiment of the present invention, the lighting device system may further comprise at least one sensor configured to sense the orientation of the lighting device, wherein the control unit is configured to control the operation of at least one light source of the plurality of light sources based on the orientation of the lighting device sensed by the at least one sensor. The present embodiment is advantageous in that the lighting device, via the sensor(s), may be adapted even more efficiently to the property(ies) of the wall on which it may be arranged upon.

According to an embodiment of the present invention, the control unit may be configured to receive input of the orientation of the lighting device from an external unit configured to sense the orientation of the lighting device.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
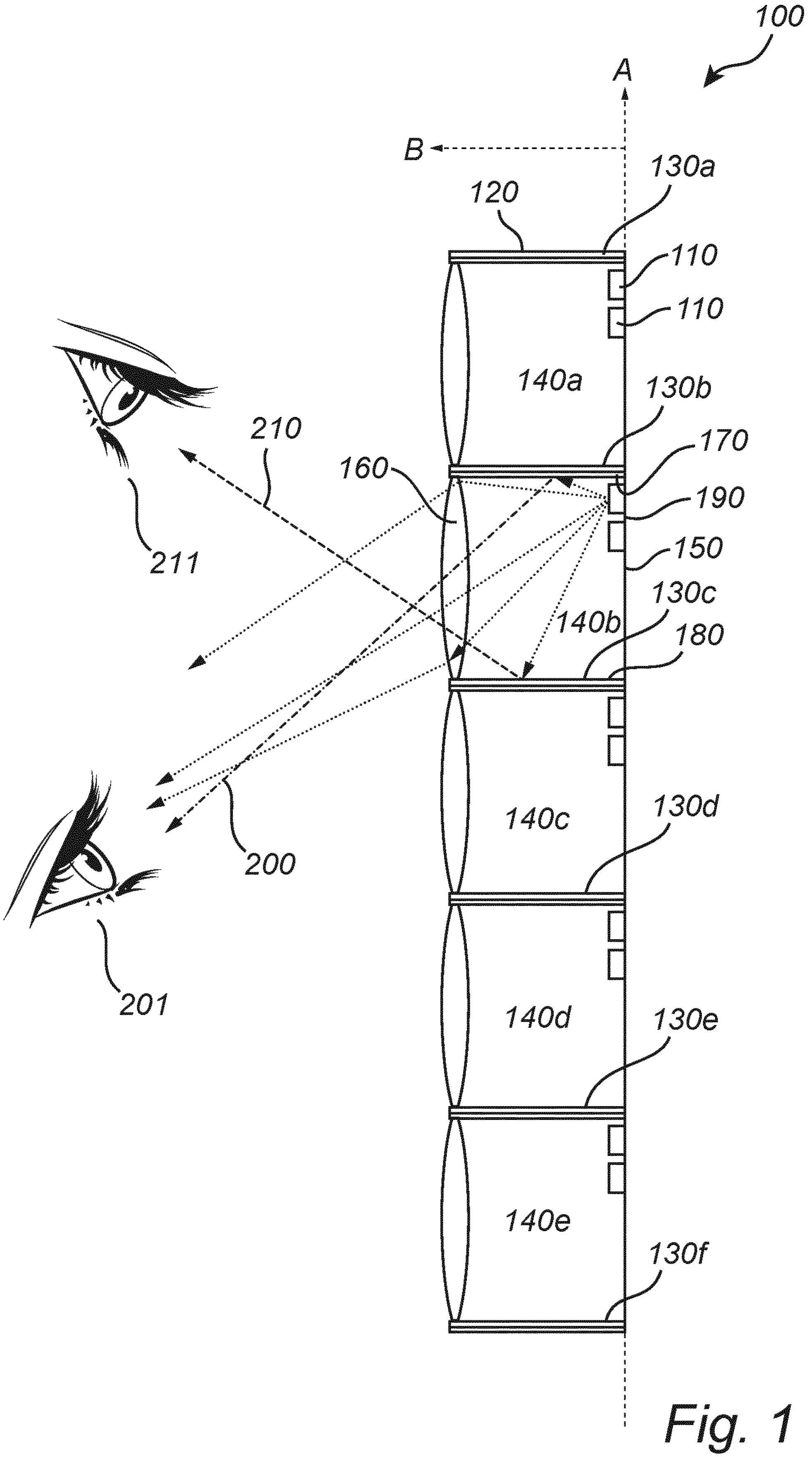
FIG. 1 schematically shows a side view of a lighting device according to an exemplifying embodiment of the present invention, FIGS. 2*a-c* schematically show pairs of partitioning elements of a lighting device according to exemplifying embodiments of the present invention, FIGS. 3*a-b* schematically show front views of a lighting device according to exemplifying embodiments of the present invention, and FIG. 4 schematically shows a front view of a lighting device according to an exemplifying embodiment of the present invention.

FIG. 1 schematically shows a lighting device 100 according to an exemplifying embodiment of the present invention. The lighting device 100 comprises an enclosure 120 with a first axis, A, and a second axis, B, oriented perpendicular to each other. In this exemplifying embodiment, the first axis, A, is vertical and the second axis, B, is horizontal. The lighting device 100 is arranged on a vertical wall, and accordingly, the enclosure 120 extends vertically. It should be noted that the enclosure 120 may have substantially any shape, form or design, and that the enclosure 120 as shown in FIG. 1 represents an exemplifying shape thereof.

The enclosure 120 comprises a back surface 150 and a front surface 160. The back surface 150 is arranged further from an observer in front of the lighting device 100 compared to the front surface 160, being closer to an observer in front of the lighting device 100. The back surface 150 and the front surface 160 are separated from each other in a direction parallel to the second axis, B, by a plurality of partitioning elements 130*a-f*. The partitioning elements 130*a-f* are spaced apart from each other along the first axis, A, within the enclosure 120. It should be noted that the number of partitioning elements 130*a-f* is arbitrary, and that the enclosure 120 may comprise substantially any number of partitioning elements 130*a-f*. Here, the partitioning elements 130*a-f* are exemplified as baffles, plates, or the like. However, one or more of the partitioning elements 130-*f* may alternatively take on other shape(s). Furthermore, the partitioning elements 130*a-f* are exemplified as being arranged parallel to the second axis, B. However, one or more of the partitioning elements 130-*f* may alternatively be arranged in a non-parallel direction with respect to the second axis, B.

Within the enclosure 120 of the lighting device 100, the partitioning elements 130*a-f* form a plurality of sub-spaces 140*a-e* arranged next to each other in a direction parallel to the first axis, A. Hence, any two adjacently arranged partitioning elements of the plurality of partitioning elements 130*a-f* at least partially define a respective sub-space of the plurality of sub-space 140*a-e* of the enclosure 120. Each sub-space of the plurality of sub-spaces 140*a-e* extends along the first axis, A, and along the second axis, B, from the back surface 150 of the enclosure 120 towards the front surface 160 of the enclosure 120. For example, in FIG. 1, the uppermost sub-space 140*a* is at least partially defined by the back surface 150 and the front surface 160 along the second axis, B, and by the partitioning elements 130*a* and 130*b* along the first axis, A.

Each sub-space of the plurality of sub-spaces 140*a-e* comprises a first reflective inner surface 170. In FIG. 1, the surface of a first (upper) partitioning element of two adjacently arranged partitioning elements of the plurality of partitioning elements 130*a-f* comprises the first reflective inner surface 170. For example, in the sub-space 140*b* of the enclosure 120 of the lighting device 100, the first (upper) partitioning element 130*b* comprises a first reflective inner surface 170. Analogously, a surface of a second (lower) partitioning element of two adjacently arranged partitioning elements of the plurality of partitioning elements 130*a-f* comprises a second reflective inner surface 180. For example, in the sub-space 140*b* of the enclosure 120 of the lighting device 100, the second (lower) partitioning element 130*c* comprises a second reflective inner surface 180. Hence, the second reflective inner surface 180 is located opposite to the first reflective inner surface 170 for each sub-space of the plurality of sub-spaces 140*a-e* in a same direction parallel to the first axis, A.

Each sub-space of the plurality of sub-spaces 140*a-e* comprises a light source 110. In FIG. 1, the light source 110 is exemplified as a plurality of light sources 110, which preferably are light-emitting diodes, LEDs. The plurality of light sources 110 may preferably be configured to emit white light. For example, the plurality of light sources 110 may be configured to emit different shades of white, and may further be configured to vary the emitted light from cool white to warm white light. Alternatively, different light sources of the plurality of light sources 110 may be configured to emit colored light. According to the exemplifying embodiment of FIG. 1, the plurality of light sources 110 is arranged in an upper portion 190 of each sub-space of the plurality of sub-spaces 140*a-e*, and at the back surface 150 of the enclosure 120. For example, in sub-space 140*b* in FIG. 1, light sources are arranged in the upper right hand side portion of the sub-space 140*b*.

A lens is provided at the front surface 160 of one or more sub-spaces of the plurality of sub-spaces 140*a-e* of the enclosure 120 of the lighting device 100. For example, the focus plane of the lens could be relatively close to the plane of the plurality of light sources 110, in order to collimate the light from the plurality of light sources 110. This arrangement may create an artificial beam of sunlight from the lighting device 100.

In FIG. 1, a first light beam 200 emitted from the light source 110 is reflected from the first reflective inner surface 170. The first light beam 200 propagates out of the sub-space of the plurality of sub-spaces 140*a-d* at the front surface 160 of the sub-space in a first direction, which is exemplified as an obliquely downward direction with respect to the second axis, B. For example, from sub-space 140*b*, the first light beam 200 is reflected from the first reflective inner surface 170 and propagates out of the sub-space 140*b* of the lighting device 100 at the front surface 160 thereof. Here, the first light beam 200 is reflected from the lighting device 100 in an obliquely downward direction with respect to the second axis, B, approximately at 45°. An observer (here represented by a schematically indicated eye 201) in front of the lighting device 100 may hereby perceive the first light beam 200 emitted from the lighting device 100 in an obliquely upward direction. Analogously, a second light beam 210 emitted from the light source is reflected from the second reflective inner surface 180. The second light beam 210 propagates out of the sub-space of the plurality of sub-spaces 140*a-d* at the front surface 160 in a second direction, which is exemplified as an obliquely upward direction with respect to the second axis, B. For example, from sub-space 140*b*, the second light beam 210 is reflected from the second reflective inner surface 180 and propagates out of the sub-space 140*b* of the lighting device 100 at the front surface 160 thereof in an obliquely upward direction with respect to the second axis, B, approximately at 45°. An observer (here represented by an eye 211) in front of the lighting device 100 may hereby perceive the second light beam 210 emitted from the lighting device 100 in an obliquely downward direction.

The light output from the light source 110 of the lighting device 100 comprises light beams in a blue wavelength range of 400-490 nm and in a non-blue wavelength range of 490-700 nm. The first blue reflectance of the first reflective inner surface is >20% for light within the blue wavelength range, i.e. 400-490 nm. Hence, the first blue reflectance of the first reflective inner surface 170 is relatively high for the color(s) of the light from the light source which is blue, or at least blue-like. Hence, an observer (here represented by a schematically indicated eye 201) in front of the lighting device 100, perceiving the first light beam 200 emitted from the lighting device 100 in an obliquely upward direction, may perceive light with a blue, or at least blue-like, color(s), corresponding to light within the wavelength range of 400-490 nm.

The second blue reflectance of the second reflective inner surface 180 is <20% for light within the blue wavelength range, i.e. 400-490 nm. Hence, the reflectance of the second reflective inner surface is relatively low for the color(s) of the light from the light source(s) which is blue, or at least blue-like. Hence, an observer (here represented by a schematically indicated eye 211) in front of the lighting device 100, perceiving the second light beam 210 emitted from the lighting device 100 in an obliquely downward direction, may not perceive the color of the light as blue, nor blue-like.

Further examples or embodiments of the lighting device 100 of FIG. 1 is described in the following. According to one example, the second reflective inner surface 180 may have a second non-blue reflectance which is higher than the second blue reflectance for light within the non-blue wavelength range. Hence, according to this example, the second reflective inner surface 180 has a higher reflectance for non-blue light compared to blue light emitted from the light source 110 of the lighting device 100 during operation. According to yet another example, the first blue reflectance of the first reflective inner surface 170 may be >80%. Hence, according to this example, the first blue reflectance of the first reflective inner surface 170 is (very) high for the color(s) of the light from the light source which is blue, or at least blue-like.

It should be noted that in case the light source 110 is configured to emit white light, the light may impinge upon the lens, the first reflective inner surface 170 and/or the second reflective inner surface 180. In case the light source is configured to emit colored light, the light beam(s) emitted from the light source is (are) configured to impinge upon the first reflective inner surface 170 and/or the second reflective inner surface 180, i.e. not directly on the lens. The color(s) of the light emitted from the light source may be blue and/or white for "sky colors" and a mix of green, yellow, orange and/or red for "earth colors".

Figure 2B:
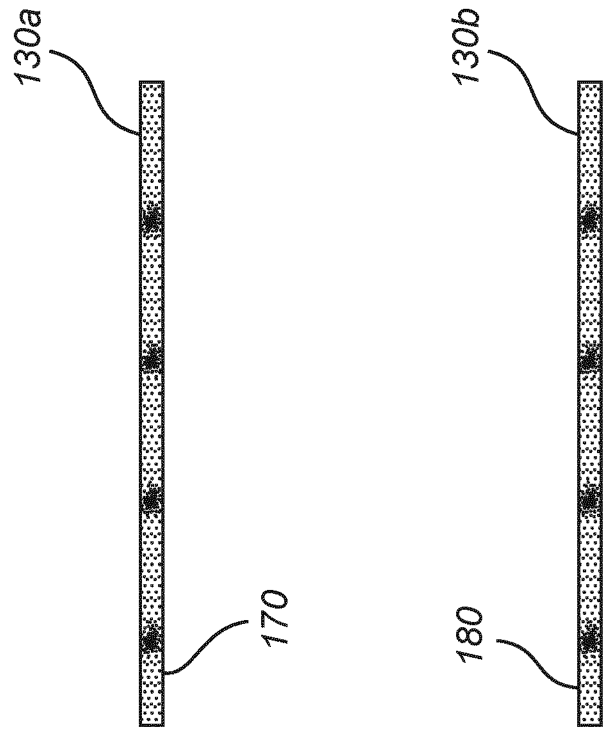
Figure 2A:
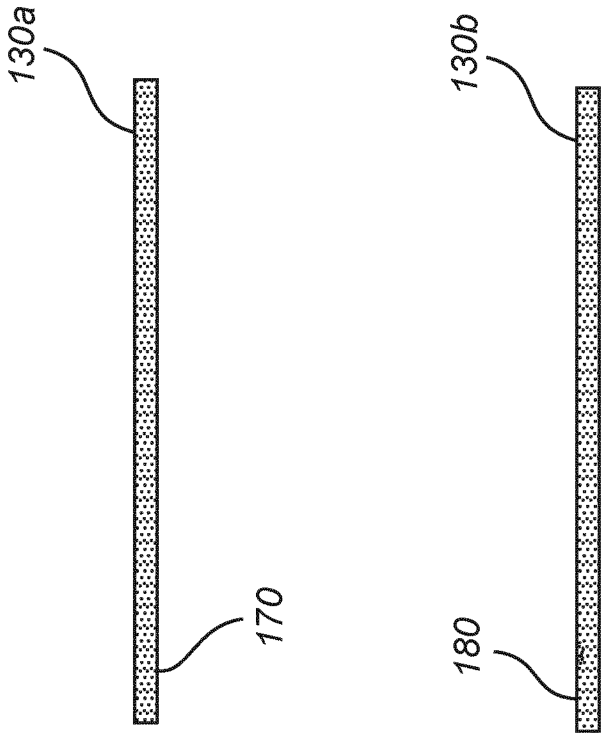

FIG. 2*a* schematically shows two partitioning elements 130*a,b* of a lighting device according to an exemplifying embodiment of the present invention. The first reflective inner surface 170 of the (first, upper) partitioning element 130*a* and the second reflective inner surface 180 of the (second, lower) partitioning element 130*b* comprise color pigments. For example, the first reflective inner surface 170 may comprise blue, or at least blue-like, color pigments. Furthermore, the first reflective inner surface 170 may be at least partially translucent. Moreover, the second reflective inner surface 180 may comprise color pigments of earth-like colors such as brown, green, or a combination thereof. It will be appreciated that in an alternative embodiment, (only) one of the first and second reflective inner surfaces 170, 180 may comprise color pigments.

FIG. 2*b* schematically shows two partitioning elements 130*a,b* of a lighting device according to an exemplifying embodiment of the present invention. Here, the color pigments of either one of the first and second reflective inner surfaces 170, 180, or both of the first and second reflective inner surfaces 170, 180, are non-uniformly distributed in the respective first and second reflective inner surfaces 170, 180. This is indicated in FIG. 2*b* by portions of the partitioning element 130*a,b* having different concentrations of certain color pigments such as e.g. blue color pigments (lighter and darker portions, respectively). The concentration of at least two color pigments may be varied in order to vary the hue of the light emitted from the light source 110 of the lighting device 100 (e.g. brown and green color pigments, or varying concentrations of cyan, magenta and/or yellow color pigments). It will be appreciated that the non-uniform distributions/concentrations of the color pigments of the first and second reflective inner surfaces 170, 180 in FIG. 2*b* are provided as examples, and that substantially any distribution/concentration of color pigments is feasible.

Figure 2C:
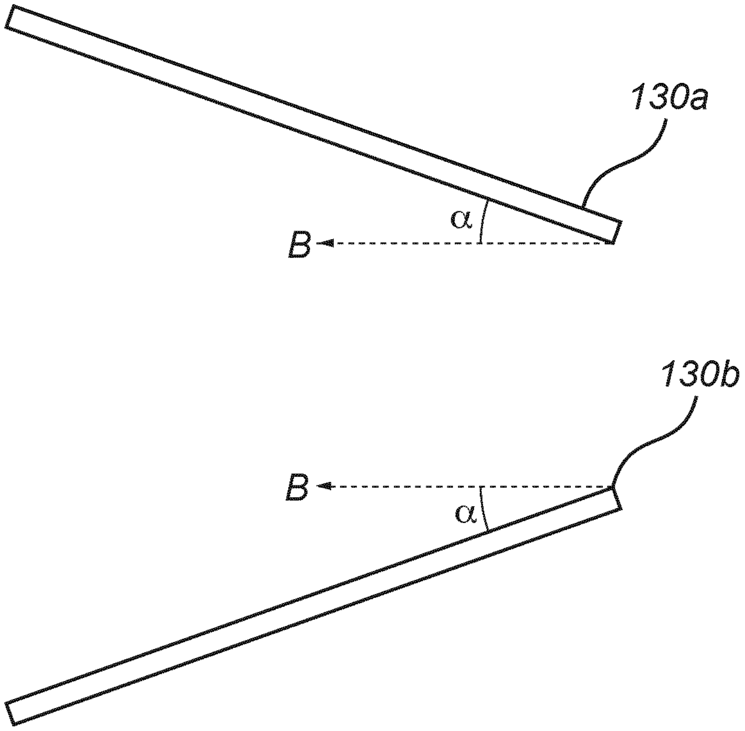

FIG. 2*c* schematically shows two partitioning elements 130*a,b* of a lighting device according to an exemplifying embodiment of the present invention. Here, both of the partitioning elements 130*a,b* are arranged at an angle, α, with respect to the second axis, B. It will be appreciated that the position and/or arrangement of the partitioning elements 130*a,b* in the enclosure 120 of the lighting device 100 may be fixed, i.e. that the angle, α, is fixed. Alternatively, one or both of the partitioning elements 130*a,b* may be adjustably arranged with respect to the angle, α, e.g. via one or more pivot points (not shown) at the respective end points of the partitioning elements 130*a,b*. It will be appreciated that the partitioning elements 130*a,b* of FIG. 2*c* may comprise the embodiment of color pigments according to FIG. 2*a* or the embodiment of different distributions/concentrations of color pigments according to FIG. 2*b*.

Figure 3B:
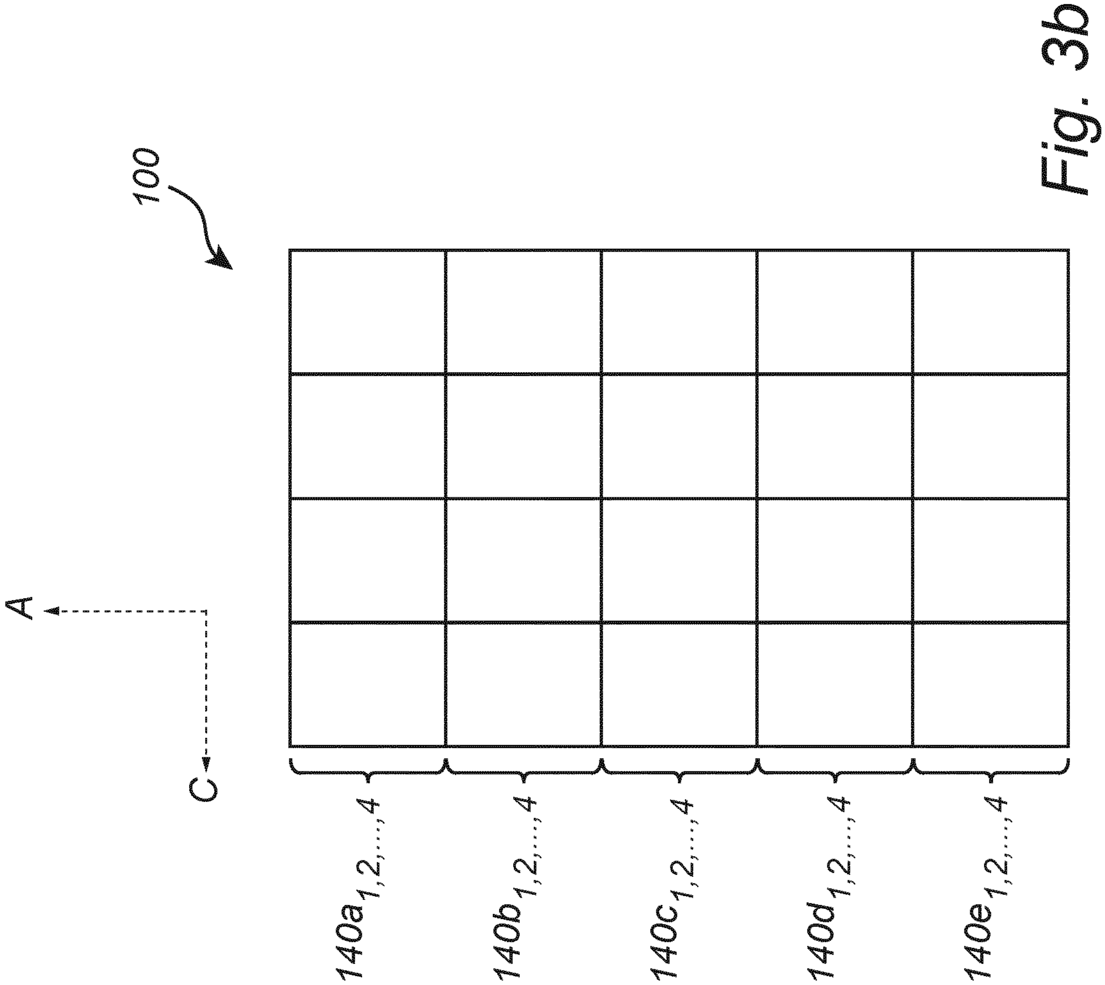
Figure 3A:
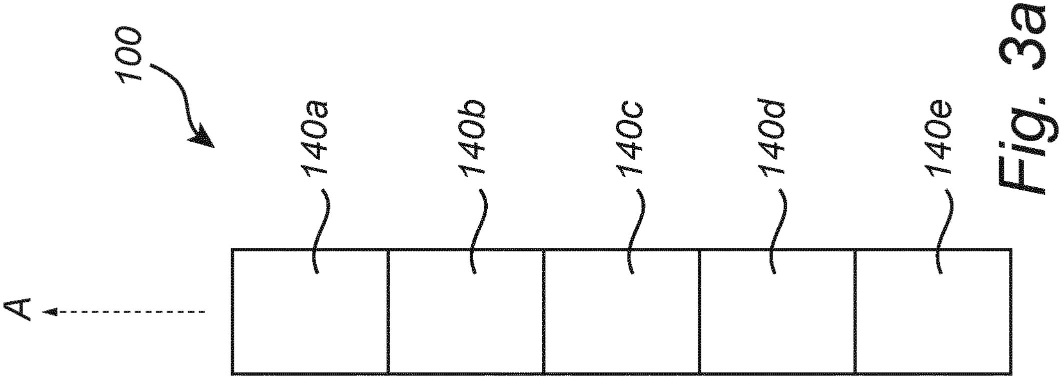

FIGS. 3*a-b* schematically show front views of a lighting device 100 according to exemplifying embodiments of the present invention. In FIG. 3*a*, the lighting device 100 is exemplified as a lighting device 100 of oblong, rectangular shape. The lighting device 100 in FIG. 3*a* may correspond and/or constitute the lighting device 100 as exemplified in FIGS. 1, and it is referred to this figure and associated caption for an increased understanding of the function of the lighting device 100. In FIG. 3*a*, the plurality of sub-spaces 140*a-e* of the enclosure of the lighting device 100 is arranged as a single linear array or column of sub-spaces 140*a-e* along the first axis, A. FIG. 3*b* shows an alternative embodiment of a lighting device 100 of the present invention compared to that shown in FIG. 3*a*, in that the plurality of sub-spaces 140*a-e* is arranged as a matrix of sub-spaces $140a_{1,2, \ldots, 4}$-$140d_{1,2, \ldots, 4}$ arranged in a plurality of columns along the first axis, A, and arranged in a plurality of rows along a third axis, C, perpendicular to the first axis, A, and perpendicular to the second axis, B. It should be noted that the number of columns and rows of the matrix of sub-spaces $140a_{1, 2, \ldots, 4}$-$140d_{1, 2, \ldots 4}$ of the enclosure of the lighting device 100 is arbitrary, and is provided as an example.

Figure 4:
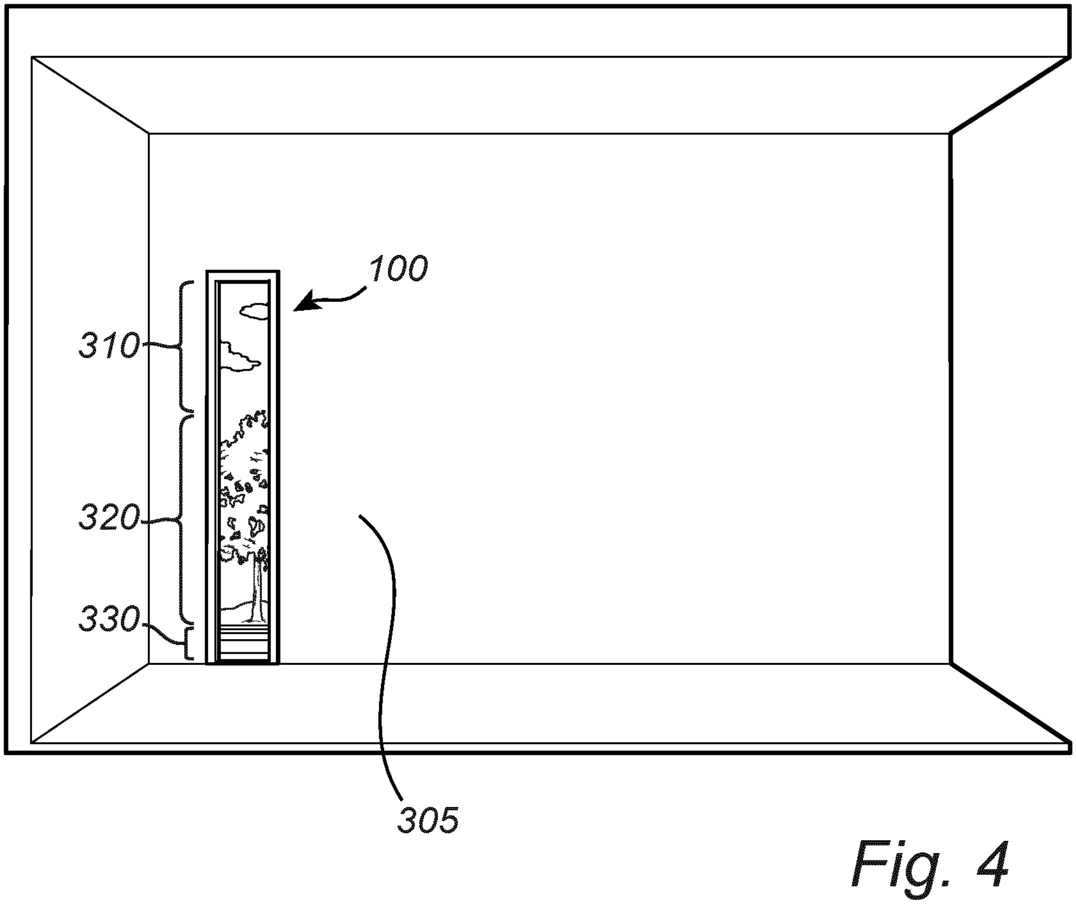

FIG. 4 schematically shows a front view of a lighting device 100 according to an exemplifying embodiment of the present invention. Here, the lighting device 100 is exemplified as a lighting device 100 of oblong, rectangular shape, although it should be noted that the lighting device 100 may have substantially any shape and/or dimensions. The lighting device 100 is vertically arranged on a wall 305 of a building, e.g. a home, office, etc. Due to the property of the lighting device 100 as exemplified of being able to emit light in an obliquely downward direction of blue, or at least blue-like, color (e.g. light of wavelength 400-490 nm) from the lighting device 100 towards an observer, an upper portion 310 of the lighting device 100 may be perceived by an observer as a blue/white sky comprising blue (or at least blue-like) colors. For example, the light emitted from the portion 310 of the lighting device 100 may render the effect of a (bright) blue sky of said portion 310. Furthermore, in this example, a central/lower portion 320 of the lighting device 100 may be perceived by the observer as green (green-like), brown (brown-like), or a combination thereof (e.g. light of wavelength 490-700 nm). Here, the central/lower portion 320 of the lighting device 100 is exemplified as a tree, albeit other objects (or perception of objects) may be even more likely and/or preferred to be provided by the lighting device 100, such as vegetation, grass, a hedge, a shrubbery, earth, or the like. Moreover, a bottom portion 330 of the lighting device 100 may be perceived as a paving, tiles, (wooden) boards, etc., e.g. of a patio.

In FIG. 4, the lighting device 100 is exemplified as comprising a plurality of sub-spaces arranged in a column (not shown) according to the arrangement in FIG. 1 and FIG. 3*a*. Alternatively, the lighting device 100 may comprise a matrix of sub-spaces arranged in one or more columns and one or more rows as exemplified in FIG. 3*b*.

The lighting device 100 may further form part of a lighting system. The lighting system may further comprise a control unit configured to control an operation of the light source of the lighting device 100 based on an orientation of the lighting device 100. For example, in case of an arrangement of the lighting device 100 on a wall which is inclined (i.e. not a strictly vertical wall 305 as exemplified in FIG. 4), the control unit may be configured to control the operation of the light source based on this inclined orientation of the lighting device 100. The lighting device system may further comprise one or more sensors configured to sense the orientation of the lighting device 100. The control unit is hereby configured to control the operation of the light source of the lighting device 100 based on the orientation of the lighting device 100 as sensed by the sensor(s). Alternatively, the control unit may be configured to receive input of the orientation of the lighting device 100 from an external unit configured to sense the orientation of the lighting device 100.

Other examples of the lighting device 100 as previously described may encompass at least one diffuser element, e.g. arranged in the vicinity of the lens(es) of the lighting device 100. Furthermore, there may be a gap between the plurality of sub-spaces 140*a-e* and the lenses. According to yet another alternative of the lighting device 100, the plurality of sub-spaces 140*a-e* may be arranged or distributed in an irregular manner.

The person skilled in the art realizes that the present invention by no means is limited to the preferred embodiments described above. On the contrary, many modifications and variations are possible within the scope of the appended claims. For example, one or more of the lighting device 100, the enclosure 120, the plurality of partitioning element(s) 130*a-f*, the plurality of sub-spaces 140*a-e*, etc., may have different shapes, dimensions and/or sizes than those depicted/described.

The invention claimed is:

1. A lighting device, comprising an enclosure with a first axis, A, and a second axis B, oriented perpendicular to each other, wherein the enclosure comprises a back surface and a front surface separated from each other in a direction parallel to the second axis, B, by a plurality of partitioning elements (130*a-f*) to form within the enclosure a plurality of sub-spaces arranged next to each other in a direction parallel to the first axis, A, wherein each sub-space comprises a first reflective inner surface and a second reflective inner surface, for all sub-spaces the second reflective inner surface being located opposite to the first reflective inner surface in a same direction parallel to the first axis, A, wherein each sub-space further comprises a light source arranged to emit light towards the front surface with a light output, the light output comprising light beams in a blue wavelength range of 400-490 nm and in a non-blue wavelength range of 490-700 nm, a first part of the light output being incident on the first reflective inner surface of the sub-space and a second part of the light output being incident on the second reflective inner surface of the sub-space, wherein, for light within the blue wavelength range, the first reflective inner surface has a first blue reflectance and the second reflective inner surface has a second blue reflectance, the first blue reflectance being more than 20% and the second blue reflectance being less than 20%.

2. The lighting device according to claim 1, wherein for light within the non-blue wavelength range, the second reflective inner surface has a second non-blue reflectance being higher than the second blue reflectance.

3. The lighting device according to claim 1, wherein, for light within the blue wavelength range, the first blue reflectance is >80%.

4. The lighting device according to claim 1, wherein at least one of the first and second reflective inner surfaces comprises color pigments.

5. The lighting device according to claim 4, wherein the color pigments of at least one of the first and second reflective inner surfaces are non-uniformly distributed in the respective first and second reflective surfaces.

6. The lighting device according to claim 1, wherein the light source is configured to emit colored light.

7. The lighting device according to claim 1, wherein at least one sub-space of the plurality of sub-spaces comprises a lens arranged at the front surface.

8. The lighting device according to claim 1, wherein at least one partitioning element of the plurality of partitioning elements is plate-shaped and arranged at an angle, α, with respect to the second axis, B.

9. The lighting device according to claim 8, wherein the at least one partitioning element is adjustably arranged with respect to the angle, α.

10. The lighting device according to claim 1, wherein the plurality of sub-spaces is an array of sub-spaces arranged in a column along the first axis, A.

11. The lighting device according to claim 1, wherein the plurality of sub-spaces is a matrix of sub-spaces arranged in at least one column along the first axis, A, and at least one row along a third axis, C, perpendicular to the first axis, A, and perpendicular to the second axis, B.

12. A lighting system, comprising the lighting device according to claim 1, a control unit configured to control an operation of the light source based on an orientation of the lighting device.

13. The lighting system according to claim 12, further comprising at least one sensor configured to sense the orientation of the lighting device, wherein the control unit is configured to control the operation of the light source based on the orientation of the lighting device sensed by the at least one sensor.

14. The lighting system according to claim 12, wherein the control unit is configured to receive input of the orientation of the lighting device from an external unit configured to sense the orientation of the lighting device.

* * * * *